United States Patent [19]
Utagawa

[11] Patent Number: 4,469,939
[45] Date of Patent: Sep. 4, 1984

[54] DISTANCE MEASURING APPARATUS
[75] Inventor: Ken Utagawa, Yokohama, Japan
[73] Assignee: Nippon Kogaku K.K., Tokyo, Japan
[21] Appl. No.: 324,990
[22] Filed: Nov. 25, 1981
[30] Foreign Application Priority Data
  Dec. 1, 1980 [JP]  Japan ................ 55-169285
[51] Int. Cl.$^3$ .................................. G01J 1/36
[52] U.S. Cl. .................... 250/204; 356/1; 354/403
[58] Field of Search ........... 250/201, 204; 356/1, 356/4; 354/25 R, 25 A, 25 P

[56]  References Cited
  U.S. PATENT DOCUMENTS
  4,178,098 12/1979 Asano et al. ................ 250/201
  4,293,205 10/1981 Tokutomi et al. ........... 250/204

Primary Examiner—David C. Nelms
Assistant Examiner—J. Brophy
Attorney, Agent, or Firm—Fitzpatrick, Cella, Harper & Scinto

[57] ABSTRACT

A distance measuring apparatus is provided with first and second imaging lenses for distance measurement for forming images of the same object, a first photoelectric device having a light-receiving surface for receiving the first image by the first imaging lens for distance measurement, a second photoelectric device having a light-receiving surface for receiving the second image by the second imaging lens for distance measurement, and varying means for varying the relative position of the light-receiving surface of the first photoelectric device and the first image thereon and the relative position of the light-receiving surface of the second photoelectric device and the second image thereon. The apparatus detects the distance to the object from the fact that the two relative positions have assumed a predetermined relation. The varying means varies the length of the optical path between the first imaging lens for distance measurement and the light-receiving surface of the first photoelectric device and the length of the optical path between the second imaging lens for distance measurement and the light receiving surface of the second photoelectric device in association with each other, at least one of the two relative positions is varied by said variation, and the first and second images on the light-receiving surfaces of the first and second photoelectric devices which were not clear when the two relative positions were not in said predetermined relation are made clear when the two relative positions have assumed said predetermined relation.

10 Claims, 18 Drawing Figures

FIG. 6
FIG. 7A
FIG. 7B
FIG. 7C
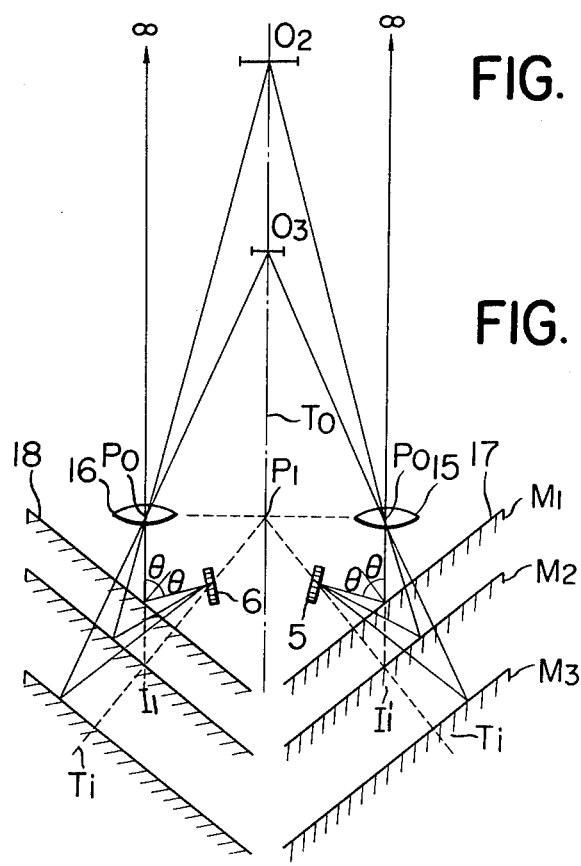
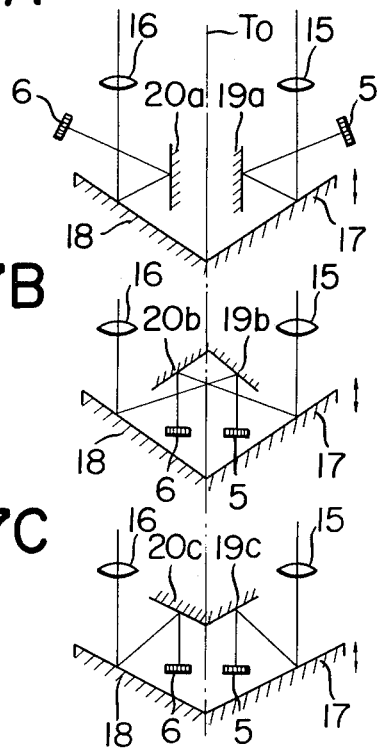

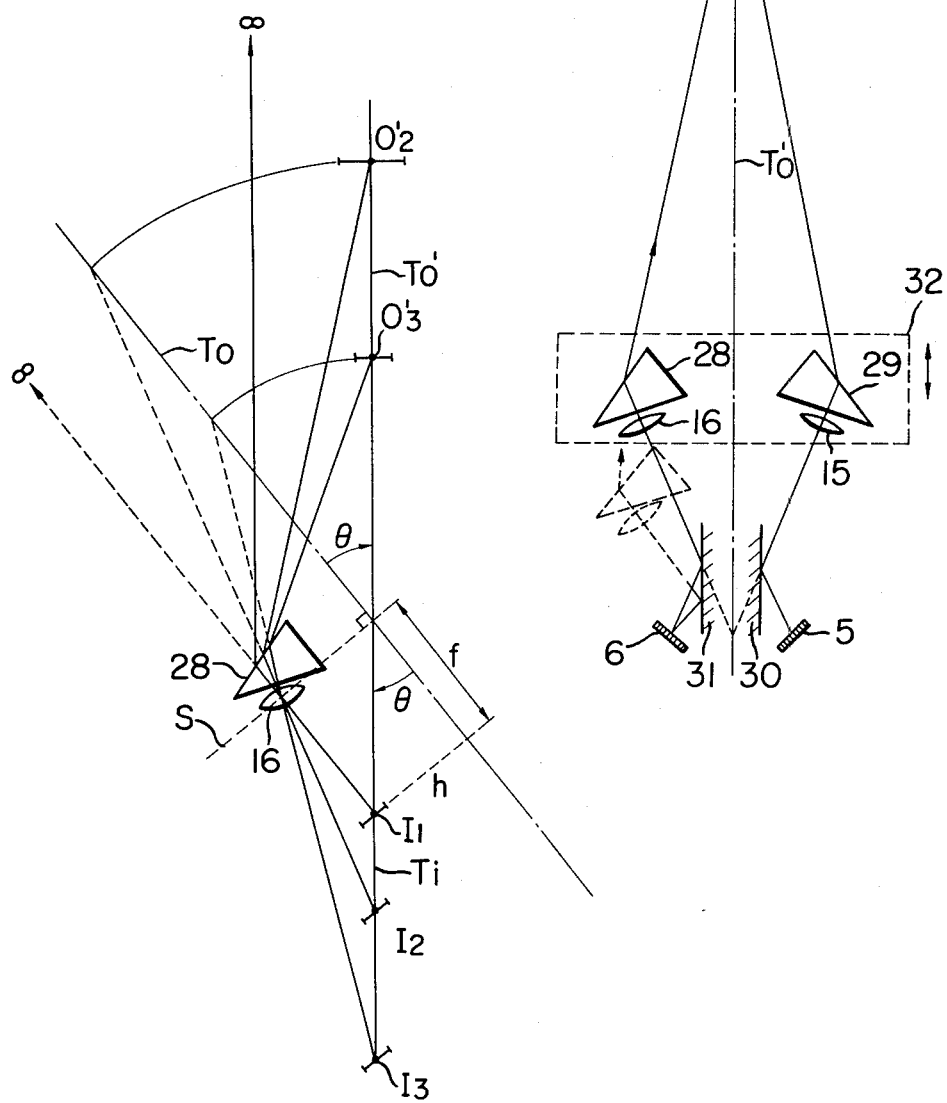

DISTANCE MEASURING APPARATUS

BACKGROUND OF THE INVENTION

1. Field of the Invention

This invention relates to an optical distance measuring apparatus, and more particularly to a distance measuring apparatus best suited for the optical focus detecting apparatus of a camera.

2. Description of the Prior Art

A patent relating to a camera focus detecting method (distance measuring method) is disclosed in Japanese Laid-open patent application No. 83524/1976 (this Japanese Patent application claims priority on the basis of U.S. application Ser. No. 529,573 and corresponding British applications were patented as British Pat. Nos. 1,521,100; 1,521,268 and 1,521,269). The distance measuring method corresponds to the distance measuring principle of the range finder, and uses a pair of photoarrays instead of the eye to scan the optical images thereon and thereby operate the correlation of the outputs of the photoarrays, thus determining the position of an object to be photographed from the position of the optical system when the correlation is best.

The principle of the optical system of this conventional focusing apparatus will hereinafter be described.

Referring to FIG. 1 of the accompanying drawings, a phototaking lens 1 has its focus adjusted so that the image of an object to be photographed is formed on a predetermined imaging plane 2 such as a film surface. A pair of imaging lenses 3 and 4 for distance measurement have an equal focal length f and both of them are fixed in the directions of the optical axes thereof and are disposed with a distance L between the optical axes thereof. One-dimensional photoelectric element arrays 5 and 6 are disposed rearwardly of the distance measuring lenses 3 and 4, respectively. These arrays 5 and 6 are identical in arrangement direction of their photoelectric elements and both of them are oriented perpendicular to the optical axes. One distance measuring lens 3 is movable in the arrangement direction of the photoelectric elements and is operatively associated with the phototaking lens 1 as shown by a dotted line so that the phototaking lens 1 is moved in the direction of its optical axis in response to movement of the distance measuring lens 3.

Assuming that the distance between the distance measuring lenses 3, 4 and the corresponding arrays 5, 6 is determined so as to be equal to the focal length f of the lenses 3, 4, when the object lies at infinity, clear images of the object by the distance measuring lenses 3 and 4 are formed at the same positions on the corresponding arrays 5 and 6, namely, such that the relative positional relations between the object images and the arrays 5, 6 are identical. At this time, the phototaking lens 1 forms the object image clearly on the predetermined imaging plane 2. On the other hand, when an object 7 lies at a finite distance a as shown in FIG. 2 of the accompanying drawings, the distance measuring lens 3 is displaced by a distance x in the arrangement direction of the photoelectric elements of the array 5, whereby the relative position of the array 5 and the object image thereon can be matched to the relative position of the array 6 and the object image thereon. At this time, the phototaking lens 1 is moved by a predetermined amount toward the object in response to the displacement x of the distance measuring lens 3. The amount of displacement x of the distance measuring lens 3 effected so that the said two relative positions are matched to each other corresponds to the object distance a and therefore, focusing operation can be accomplished by moving the phototaking lens 1 in accordance with the amount of displacement x.

An in-focus detecting apparatus is also known in which a mirror is swung to thereby displace the optical image as shown in FIG. 3 of the accompanying drawings. This distance measuring system is comprised of a fixed mirror 8, a rotatable mirror 9, a reflecting member 10, a pair of imaging lenses 11 and 12 for distance measurement, and a pair of photoelectric element arrays 5 and 6. The rotatable mirror 9 is rotated so that the relative positional relations between the optical images by the distance measuring lenses 11, 12 and the arrays 5, 6 are matched to each other. This matching is detected by the photoelectric outputs of the arrays 5 and 6. The phototaking lens 1 is moved in the direction of its optical axis in response to the rotatable mirror 9, whereby it is focus-adjusted.

However, as is apparent from FIGS. 1 and 2, for an object lying at infinity, clear images are formed on the arrays 5 and 6, while for an object lying at a finite distance, particularly, at a very short distance, the images on the arrays 5 and 6 become greatly blurred (unclear). Accordingly, detecting the matching between said two relative positions with respect to such blurred images results in reduced accuracy and, in some cases, it is electrically very difficult.

SUMMARY OF THE INVENTION

It is therefore an object of the present invention to provide a distance measuring apparatus in which the optical images of an object lying at any distance are clearly formed on photoelectric devices when the two relative positions have assumed a predetermined relation.

The invention will become fully apparent from the following detailed description thereof taken in conjunction with the accompanying drawings.

BRIEF DESCRIPTION OF THE DRAWINGS

FIG. 6 is an optical arrangement view showing a second embodiment of the present invention.

FIGS. 7A, 7B, and 7C are optical arrangement views showing modifications of the second embodiment.

FIG. 12 is an optical arrangement view illustrating the principle of a modification of the third embodiment.

FIG. 13 is an optical arrangement view showing a specific example of the modification of the third embodiment.

DESCRIPTION OF THE PREFERRED EMBODIMENTS

The optical characteristic which forms the basis of the present invention will hereinafter be described.

Figure 1:
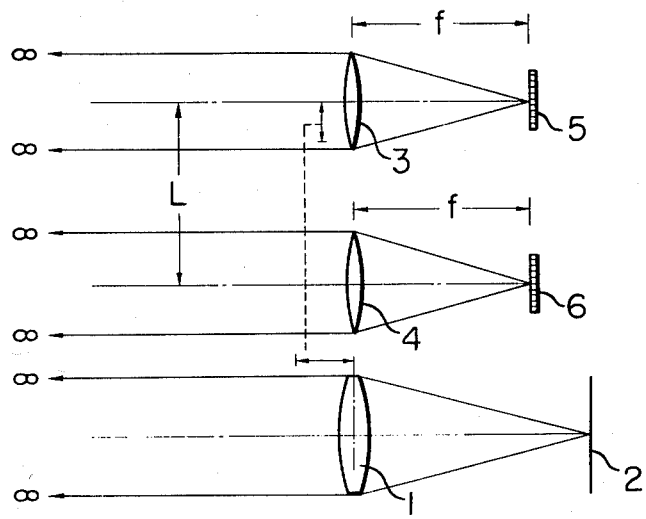
FIGS. 1 and 2 are optical arrangement views illustrating the principles of the optical systems of the focusing apparatus according to the prior art.
Figure 2:
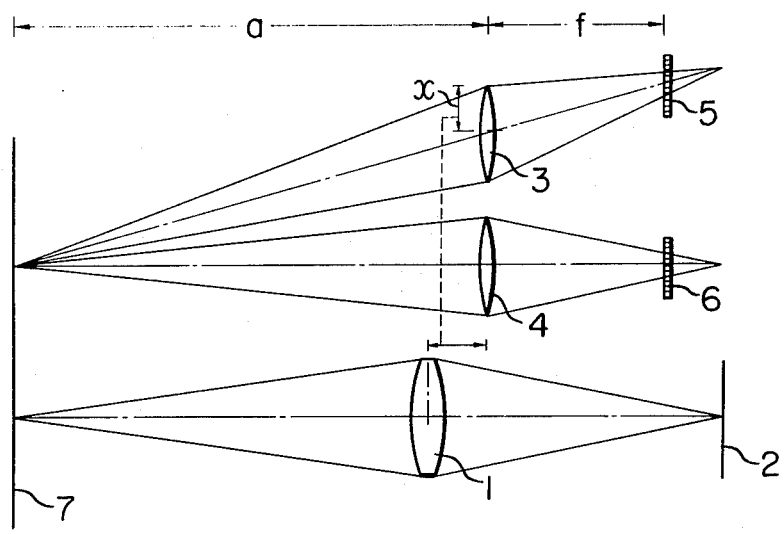
Figure 3:
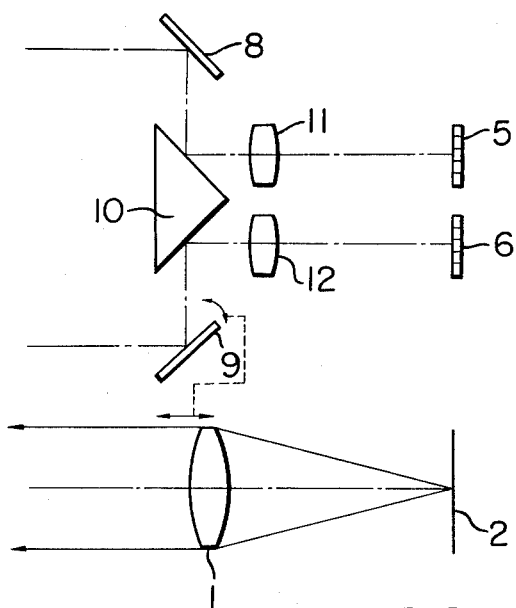
FIG. 3 is an optical arrangement view illustrating the principle of another apparatus according to the prior art.
Figure 4:
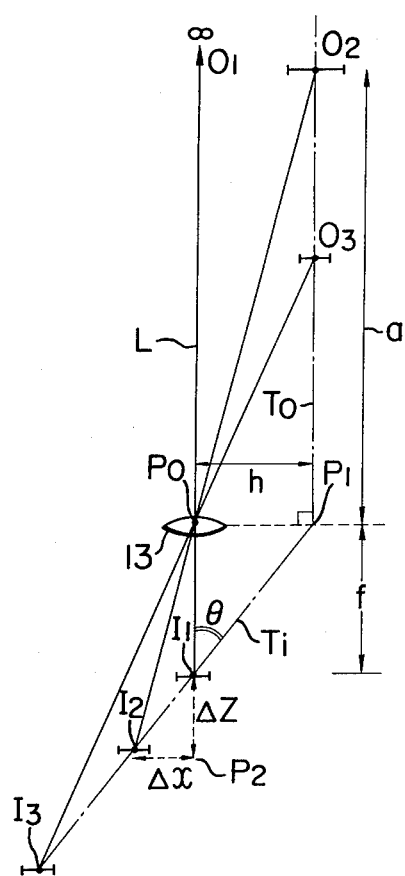
FIG. 4 is an optical arrangement view illustrating the optical characteristic which forms the basis of the present invention.

In FIG. 4, an imaginary axis passing through objects whose distances are to be measured is defined as an object axis To. Consider a case where objects $O_1$, $O_2$ and $O_3$ positioned on the object axis To spaced apart a distance h from the optical axis L of a distance measuring lens 13 are imaged by the distance measuring lens 13. The distance measuring lens 13 forms the image of the object $O_1$ lying at infinity at a position $I_1$ on the optical axis L spaced apart by its focal length f, and forms the images of the objects $O_2$ and $O_3$ lying at finite distances at positions $I_2$ and $I_3$ more distant than the position $I_1$ and deviated from the optical axis L.

Assuming that the position of the image $I_2$ of the object $O_2$ is spaced apart by $\Delta z$ in the direction of the optical axis from the position of the image $I_1$ of the object lying at infinity and by $\Delta x$ in the direction perpendicular to the optical axis, $\Delta x$ and $\Delta z$ will now be sought after. If the foot of the perpendicular from the center $P_0$ of the distance measuring lens 13 to the object axis To is $P_1$ and the foot of the perpendicular from the position $I_2$ to the optical axis L is $P_2$, a triangle $\Delta P_0 P_1 O_2$ and a triangle $\Delta P_0 I_2 P_2$ are similar to each other and therefore, there is established $$\Delta x/h = (f + \Delta z)/a \quad \text{\textcircled{1}}$$

where a is the distance from the distance measuring lens 13 to the object $O_2$.

Also, assuming that the image of a certain object lying at a distance $d_1$ from the forward focus position of an imaging lens is formed at a distance $d_2$ from the rearward focus position of the imaging lens, $d_1 \cdot d_2 = f^2$ is established as is well known as a formula of geometrical optics.

If this formula is applied to the present case, there is obtained $$(a - f) \cdot \Delta z = f^2 \quad \text{\textcircled{2}}$$

since $d_1 = a - f$ and $d_2 = \Delta z$.

From equations ① and ②, there is obtained $$\Delta x/\Delta z = h/f = \tan \theta \quad \text{\textcircled{3}}, \text{ where } \theta = <P_0 I_1 P_1.$$

As is apparent from this equation ③, the angle $\theta$ is constant independently of the object position and therefore, the imaging points $I_2$ and $I_3$ of the object points $O_2$ and $O_3$ lying on the object axis To are positioned on a straight line Ti passing through the point $P_1$ and the imaging point $I_1$ of the infinity object.

Embodiments of the present invention will now be described.

Figure 5:
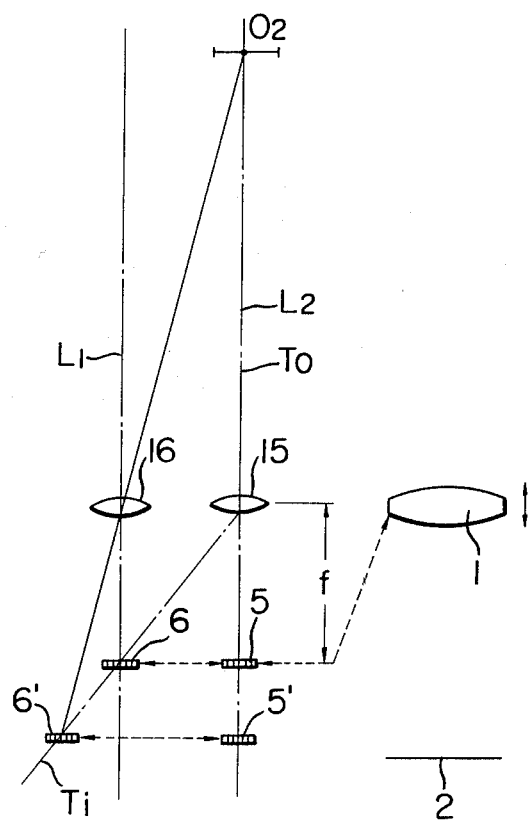
FIG. 5 is an optical arrangement view showing a first embodiment of the present invention.

Referring to FIG. 5 which shows a first embodiment of the present invention, a pair of imaging lenses 15 and 16 for distance measurement have an identical focal length f, and corresponding photoelectric element arrays 5 and 6 are disposed rearwardly of the respective lenses 15 and 16. These photoelectric element arrays 5 and 6 are moved in response to each other so that when the array 5 is moved on the optical axis $L_2$ (which is coincident with To) of the distance measuring lens 15, the array 6 is moved on the axis Ti and that the distance between the array 5 and the distance measuring lens 15 is equal to the distance between the projected position of the array 6 onto the optical axis $L_1$ of the distance measuring lens 16 and the distance measuring lens 16. Accordingly, assuming that the arrays 5 and 6 as shown lie at the focus positions of the distance measuring lenses 15 and 16 when the object $O_2$ lies at a finite distance, a blurred image of the object $O_2$ is formed on the array 5 at the center thereof, while a blurred image of the object $O_2$ is formed on the array 6 at a leftwardly deviated position thereon. The deviation between the relative position of the array 5 and the blurred image thereon and the relative position of the array 6 and the blurred image thereon is detected by a detecting circuit, not shown, from the photoelectric outputs of the arrays 5 and 6. When the arrays 5 and 6 are moved on the axes To and Ti to positions 5' and 6' respectively, the relative positions of the images on the arrays 5 and 6 are matched to each other. When this matching is achieved, the images on the arrays 5 and 6 become clear. The positions of the arrays 5 and 6 when this matching of the relative positional relation has been achieved correspond to the object distance and therefore, focusing of the phototaking lens 1 can be accomplished by determining the position of the phototaking lens 1 correspondingly to these array positions.

Thus, in the present embodiment, the positions of the arrays 5 and 6 when the two relative positions have been matched to each other correspond to the object distance and, for any object lying at any distance, the object image becomes less blurred as the matched condition is approached, and the object image becomes clearest when the matching has been achieved. Accordingly, the matched condition can be detected with high accuracy and consequently, distance measurement or in-focus detection can be accomplished with high accuracy.

A second embodiment will now be described.

Referring to FIG. 6, a pair of distance measuring lenses 15 and 16 are fixed. Movable mirrors 17 and 18 corresponding to the distance measuring lenses 15 and 16, respectively, are perpendicular to axes Ti and Ti', respectively, and are parallel-moved in response to each other so as to keep such perpendicular condition.

The axes Ti and Ti', as hereinbefore described, are straight lines passing through the foot $P_1$ of the perpendicular from the center $P_0$ of the distance measuring lens 15, 16 to the object axis To and the focus positions $I_1$ and $I_{1'}$ on the optical axes of the distance measuring lenses 15 and 16. Photoelectric element arrays 5 and 6 are disposed at arbitrary positions on the axes Ti and Ti' between points $P_1$ and $I_1$ and between points $P_1$ and $I_{1'}$. Accordingly, the mirrors 17 and 18 are arranged so that the principal ray when the object lies at infinity is incident on the mirrors 17 and 18 at an incidence angle $\theta$, that is, the optical axes of the lenses 15 and 16 intersect the mirrors 17 and 18, respectively, at an angle $\theta$, and the arrays 5 and 6 are arranged so that the image of that object lying at infinity is clearly formed on the photoelectric element arrays 5 and 6. The angle $\theta$ is $\theta = \tan^{-1}(h/f)$, where h is the distance between the center of the distance measuring lens 15, 16 and the object axis To, and f is the focal length of the distance measuring lens 15, 16. This arrangement condition of the movable mirrors 17, 18 and the photoelectric element arrays 5, 6 is established regardless of the number of mirrors or the like interposed to bend the optical path.

With such construction, if the mirrors 17 and 18 are brought to a position $M_1$ when the object lies at infinity, both the images of the infinity object on the arrays 5 and 6 become clear and the relative positions of the object images on the arrays 5 and 6 become coincident. On the other hand, where the object lies at the position $O_2$ when the mirrors 17 and 18 are at the position $M_1$, blurred images are formed on the arrays 5 and 6 and the relative positions of those images are deviated from each other. Thereupon, the mirrors 17 and 18 are parallel-moved from the position $M_1$ to a position $M_2$, whereby the images of the object $O_2$ on the arrays 5 and 6 become clear and the relative positions thereof become coincident. Similarly, for the object $O_3$, the mirrors 17 and 18 are brought to a position $M_3$, whereby the images on the arrays become clear and the relative positions thereof become coincident. Thus, in the present embodiment, the position of the mirrors 17 and 18 when the relative positions are coincident is representative of the then object distance. Accordingly, in-focus becomes possible by determining the position of the phototaking lens in accordance with the position of the mirrors 17 and 18 when the relative positions are coincident.

In the present embodiment, one distance measuring system 15, 17, 5 and the other distance measuring system 16, 18, 6 are disposed symmetrically with respect to the object axis To and therefore, the mirrors 17 and 18 are moved entirely identically. Accordingly, if the two mirros 17 and 18 are made integral with each other, the construction will become simpler.

FIGS. 7A, B and C show modifications of the second embodiment. All of these modifications are ones in which the movable mirrors 17 and 18 are made integral with each other and fixed mirrors 19a, 20a; 19b, 20b; 19c, 20c are disposed between the mirrors 17, 18 and corresponding photoelectric element arrays 5, 6.

Figure 8A:
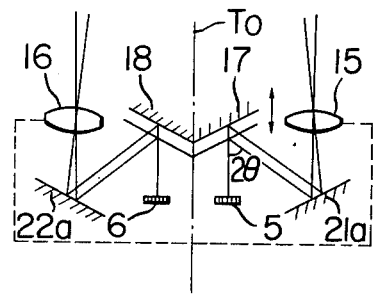
FIGS. 8A, 8B, 8C, and 8D are optical arrangement views showing further modifications of the second embodiment.
Figure 8B:
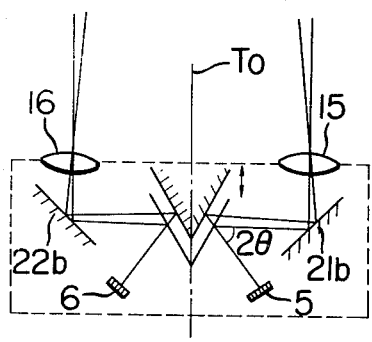
Figure 8C:
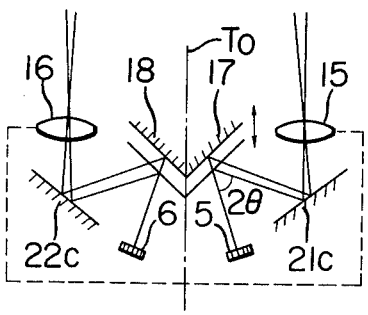
Figure 8D:
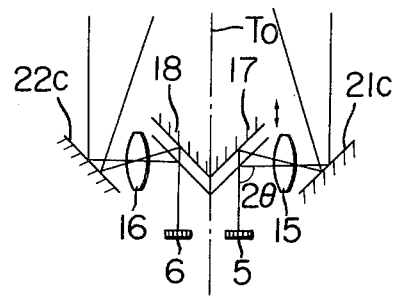

FIGS. 8A, B and C show cases where fixed mirrors 21a, 22a; 21b, 22b; 21c, 22c are provided between integral movable mirros 17, 18 and distance measuring lenses 15, 16. FIG. 8A shows a case where the fixed mirrors 21a, 22a and corresponding movable mirrors 17, 18 are parallel, FIG. 8B shows a case where the fixed mirrors 21b, 22b bend the optical path at a right angle, and FIG. 8C shows a case where the vertical angles of the movable mirros 17 and 18 are designed to be 90°. In any of these cases, the angles of incidence and reflection with respect to the fixed mirrors are arbitrary, but the angles of incidence and reflection of the principal ray of an infinity object with respect to the movable mirrors must substantially satisfy the condition of the aforementioned angle $\theta$. FIG. 8D shows a case where fixed mirrors 21d and 22d are disposed forwardly of the distance measuring lenses 15 and 16.

In the second embodiment shown in FIGS. 6–8, the distance measuring lenses 15, 16 and the photoelectric element arrays 5, 6 are all fixed and the movable mirrors 17, 18 are provided therebetween and rectilinearly moved in the same direction, and this facilitates the construction.

Figure 9:
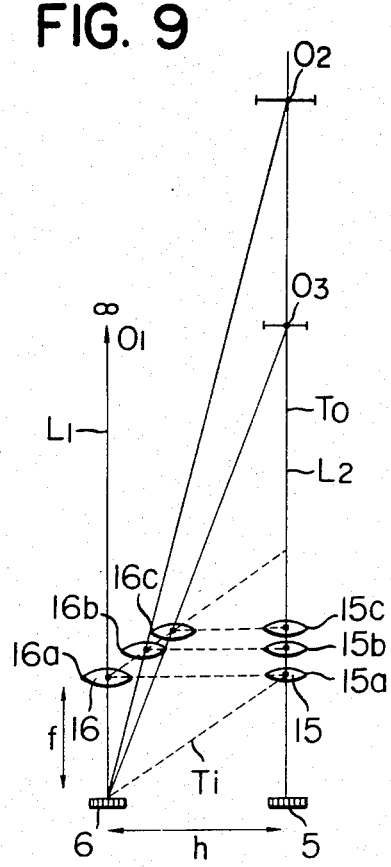
FIG. 9 is an optical arrangement view showing a third embodiment of the present invention.
Figure 10:
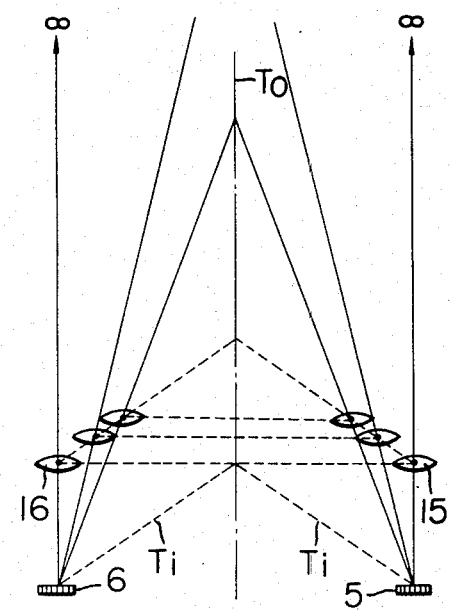
FIG. 10 is an optical arrangement view illustrating an example in which the two distance measuring lenses in the third embodiment are moved symmetrically.

Description will now be made of a third embodiment in which distance measuring lenses are moved. In FIG. 9, in order that the distance measuring lenses 15 and 16 may be moved such that the images on the arrays 5 and 6 are completely clear when said relative positions have become completely coincident, the loci depicted by the centers of the distance measuring lenses 15 and 16 are not straight. In an ordinary case where the object distance is sufficiently greater than the focal length of the distance measuring lenses, the distance measuring lenses are moved along a straight line parallel to Ti, whereby the images on the arrays can be kept sufficiently clear when the relative positions have become coincident. In FIG. 9, the distance measuring lens 16 is moved to positions 16a, 16b and 16c in parallelism to Ti correspondingly to the fact that objects lie at infinity position $O_1$ and finite positions $O_2$ and $O_3$. In this case, the other distance measuring lens 15 is also moved on the axis To to positions 15a, 15b and 15c. FIG. 10 shows a case where the two distance measuring lenses 15 and 16 are moved symmetrically.

Figure 11:
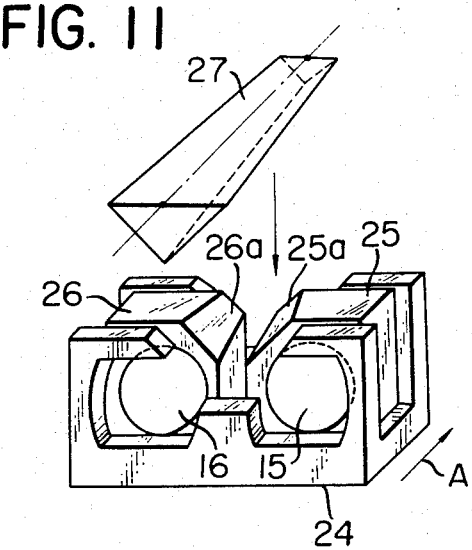
FIG. 11 is a perspective view showing a specific example of a construction for achieving the movement of the two distance measuring lenses in the third embodiment.

FIG. 11 shows an example of the specific construction for achieving such movement of the distance measuring lenses 15 and 16. In FIG. 11, holders 25 and 26 for supporting a pair of distance measuring lenses 15 and 16 are contained in an outer frame 24. These holders 25 and 26 are slidable in a direction perpendicular to the optical axis and are biased laterally toward each other by biasing means such as springs, not shown. Inclined surfaces 25a and 26a are formed in the holders 25 and 26 in opposed relationship with each other. A lens spacing adjusting member 27 in the form of a trigonal pyramid is supported by unshown means at a position whereat it bears against the inclined surfaces 25a and 26a.

With such construction, the outer frame 24 is moved in the direction of the optical axis. When the outer frame is moved, for example, in the direction of arrow A, the holders 25 and 26 come toward each other by virtue of the unshown biasing means because the lens spacing adjusting member 27 in the form of a trigonal pyramid is thin at its tip end. In this manner, movement of the outer frame 24 in the direction of the optical axis causes movement of the distance measuring lenses 15 and 16 in the same direction while, at the same time, these lenses are moved laterally relative to the outer frame 24 by the lens spacing adjusting member 27 and the unshown biasing means.

In the foregoing examples shown in FIGS. 9 and 10, the distance measuring lenses must be moved in the direction of the optical axis and in the direction perpendicular to the optical axis at a time and the moving device therefor is complicated as shown in FIG. 11.

Description will now be made of a modification of the third embodiment which overcomes such disadvantage.

The principle will first be described. In FIG. 12, a prism 28 as a member for deflecting light is disposed forwardly of the distance measuring lens 16. The function of this prism 28 is such that if it is absent, the object on the object axis To is formed on the axis Ti inclined at an angle $\theta$ with respect thereto, whereas if the prism 28 is present, the object on the object axis To' inclined at an angle $\theta$ with respect to the object axis To is formed on the axis Ti. That is, the function of the prism 28 is to cause the images $I_1$, $I_2$ and $I_3$ of an infinity object positioned on the extension of the axis Ti and objects $O_{2'}$ and $O_{3'}$ lying at finite distances to be formed on the axis Ti. Accordingly, by moving the distance measuring lens 16 and the prism 28 together parallel to the axis Ti, the images of the objects $O_{2'}$ and $O_{3'}$ on the axis To' can be formed at the same position on the axis Ti.

FIG. 13 shows a specific example of a distance measuring optical system based on such principle. In FIG. 13, a distance measuring lens 15 and a prism 29 are disposed symmetrically with a distance measuring lens 16 and a prism 28 with respect to the object axis To'. These distance measuring lenses 15, 16 and prisms 28, 29 are moved parallel to the axis To' completely as a unit. Photoelectric element arrays 5 and 6 receive the reflected lights reflected by fixed mirrors 30 and 31. By causing a block 32 encircled by dotted line which holds the distance measuring lenses 15, 16 and prisms 28, 29 as a unit to move along the aixs To', the object image on the axis To' can be clearly formed on the arrays 5 and 6, and the then position of the block 32 is representative of the object distance.

In the present embodiment, photoelectric element arrays are used as the photoelectric devices, whereas any devices which are capable of detecting the relative positions of the light-receiving surfaces of the photoelectric devices and the images thereon could be used as the photoelectric devices. The optical axes of the distance measuring lenses may be inclined with respect to the object axis To.

Accordingly to the present invention, as hitherto described, the lengths of the optical paths between two distance measuring lenses and the light-receiving surfaces of corresponding photoelectric devices are varied in association with each other, whereby the relative positions of the light-receiving surfaces of the two photoelectric devices and the images thereon can be varied and at the same time, these images can be made clear.

Accordingly, the images become clear without fail when the two relative positions have assumed a predetermined relation such as matching and thus, distance measurement of high accuracy can be accomplished.

I claim:

1. A distance measuring apparatus including first and second imaging lenses for forming images of the same object, a first photoelectric device having a light-receiving surface for receiving the first image by said first imaging lens, a second photoelectric device having a light-receiving surface for receiving the second image by said second imaging lens, and varying means for varying the length of the optical path between said first imaging lens and said light-receiving surface of said first photoelectric device and the length of the optical path between said second imaging lens and said light-receiving surface of said second photoelectric device so that when the object and said light-receiving surface of said first photoelectric device are brought into a conjugate relation with respect to said first imaging lens, the object and said light-receiving surface of said second photoelectric device are brought into a conjugate relation with respect to said second imaging lens, the path lengths, together, representing the distance to the object.

2. A distance measuring apparatus according to claim 1, wherein said varying means includes a first movable reflecting member (17) disposed between said first imaging lens (15) and the light-receiving surface of said first photoelectric device (5), a second movable reflecting member (18) disposed between said second imaging lens (16) and the light-receiving surface of said second photoelectric device (6), and means for moving said first movable reflecting member so that the reflecting surface of said first movable reflecting member in any position is parallel to the same surface of said first movable member in any other position during the movement thereof, and for moving said second movable reflecting member so that the reflecting surface of said second movable reflecting member in any position is parallel to the same surface of said second movable reflecting member in any other position thereof.

3. A distance measuring apparatus according to claim 2, wherein said moving means moves said first and second movable reflecting members (17, 18) so that the optical axes of said first and second imaging lenses intersect the reflecting surface of said first movable reflecting member and the reflecting surface of said second movable reflecting member always substantially at an angle $\theta$ and wherein $\theta = \tan^{-1}(h/f)$, where f is the focal length of said imaging lenses, and h is the distance between the centers of said imaging lenses and an imaginary axis on which the object whose distance is to be measured is positioned.

4. A distance measuring apparatus according to claim 1, wherein said varying means moves said first and second imaging lenses in the directions of their respective optical axes and at the same time moves at least one of said imaging lenses in the direction perpendicular to its optical axis.

5. A distance measuring apparatus according to claim 4, wherein said one imaging lens is moved substantially parallel to a straight line passing through the foot of the perpendicular from said one imaging lens when it has clearly formed the image of an infinity object on the light-receiving surface of the photoelectric device corresponding to said one imaging lens to said imaginary axis and through the light-receiving surface of said corresponding photoelectric device.

6. A distance measuring apparatus according to claim 1, wherein said varying means moves said first and second photoelectric devices.

7. An apparatus for providing a measure of the distance between the apparatus and an object, comprising:
a first image forming lens;
a second image forming lens;
first means having a first fixed surface;
second means having a second fixed surface;
a movable mirror disposed in the optical path between said first lens and said first fixed surface, the first movable mirror being moved so that, during the movement thereof the reflecting surface thereof in any position is parallel to the same surface in any other position thereof;
a second movable mirror disposed in the optical path between said second lens and said second fixed surface, the second movable mirror being moved so that, during the movement thereof the reflecting surface thereof in any position is parallel to the same surface in any other position thereof;
the first and the second mirrors being so operatively associated that when an arbitrary object on an axis distant from said first lens by a predetermined length and said first fixed surface are brought into a conjugate relation with respect to said first lens by the movement of said first mirror, the movement of the second mirror associated with the movement of the first mirror may bring said object and said second fixed surface to a conjugate relation with respect to said second lens; and
each position of said first and second mirrors, when said conjugate relations are attained representing said distance.

8. An apparatus according to claim 7, wherein said first mirror is so arranged that an angle subtended by a light ray incident on the reflecting surface of said first mirror from an infinitely distant object lying on said axis through said first lens and a line perpendicular to said reflecting surface may be substantially $\tan^{-1}(h_1/f_1)$; and said second mirror is so arranged that an angle subtended by a light ray incident on the reflecting surface of the second mirror from said infinitely distant object through said second lens and a line perpendicular to said reflecting surface of the second mirror may be substantially $\tan^{-1}(h_1/f_2)$, where $f_1$ and $f_2$ are the focal lengths of said first and second lenses, respectively, and $h_1$ and $h_2$ are a distance between the center of the first lens and said axis and a distance between the center of the second lens and said axis, respectively.

9. An apparatus according to claim 8, wherein said first means and said second means are, respectively, photoelectric conversion means; said focal lengths $f_1$ and $f_2$ are equal with each other, and said distances $h_1$ and $h_2$ are equal with each other.

10. A distance measuring apparatus comprising:

an image forming optical system having a focal length f, the optical system forming an image of an object located on an axis distant from the center of the optical system by a length h;

photoelectric conversion means;

a movable mirror which has a reflecting surface, and is moved so that, during the movement of the mirror, the reflecting surface at any position is parallel to the same surface at any other position the movable mirror being so disposed that light rays from said object through said optical system may be incident on the movable mirror, that an angle subtended by a line perpendicular to the reflecting surface and a light ray incident on the reflecting surface from an infinitely distant object lying on the axis through the center of said optical system, may be substantially $\tan^{-1}(h/f)$, and that the movement of said mirror may bring said object and said photoelectric conversion means into a conjugate relation with respect to said optical system, the position of said mirror representing the distance to said object when said conjugate relation is attained.

* * * * *